(12) United States Patent
Paetzold (10) Patent No.: US 6,729,200 B2
(45) Date of Patent: May 4, 2004

(54) SELECTOR DEVICE FOR A CHANGE-SPEED GEARBOX

(75) Inventor: Reiner Paetzold, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/842,206

(22) Filed: Apr. 26, 2001

(65) Prior Publication Data

US 2002/0005079 A1 Jan. 17, 2002

(30) Foreign Application Priority Data

Apr. 26, 2000 (DE) .................................. 100 20 451

(51) Int. Cl.$^7$ .............................................. F16H 59/02
(52) U.S. Cl. ............... 74/473.25; 74/337.5; 74/473.36; 74/483 R
(58) Field of Search ............... 74/335, 337.5, 74/473.1, 473.21, 473.24, 473.25, 473.23, 473.36, 473.37

(56) References Cited

U.S. PATENT DOCUMENTS

| | | | | |
|---|---|---|---|---|
| 4,449,416 A | * | 5/1984 | Huitema | 74/337.5 |
| 4,615,233 A | * | 10/1986 | Lasoen | 74/360 X |
| 4,713,979 A | * | 12/1987 | Muto et al. | 74/337.5 |
| 4,799,399 A | * | 1/1989 | Bruce | 74/473.24 |
| 5,704,252 A | * | 1/1998 | Loeffler | 74/473.24 |
| 5,740,695 A | * | 4/1998 | Janson | 74/337.5 |
| 5,809,836 A | | 9/1998 | Paetzold et al. | |
| 6,122,983 A | * | 9/2000 | Hoffman | 74/337.5 |
| 6,173,624 B1 | * | 1/2001 | Decker | 74/473.37 |
| 6,357,316 B1 | * | 3/2002 | Bieber | 74/473.24 |

FOREIGN PATENT DOCUMENTS

| | | |
|---|---|---|
| DE | 19610104 C2 | 9/1997 |
| DE | 19610104 | 9/1998 |
| EP | 1116903 | 7/2000 |

* cited by examiner

Primary Examiner—David A. Bucci
Assistant Examiner—Colby Hansen
(74) Attorney, Agent, or Firm—Crowell & Moring LLP (57) ABSTRACT

In a selector device for a change-speed gearbox, a selector shaft arranged in such a way as to be rotatable and axially displaceable relative to a housing is connected by respective auxiliary mechanisms for converting a reciprocating motion into a rotary motion by at least two choosing sleeves that are arranged concentrically, rotatably and in an axially displaceable manner relative to it and are fixed rotatably and in an axially nondisplaceable manner relative to the housing when firmly braked by respective brakes. In significant angular positions, the selector shaft can be actuated out of a neutral position in one of the two axial directions of its axis of rotation into an end position associated with a respective gear. The auxiliary mechanisms are harmonized in such a way with one another that the respective new gear can be chosen initially and selected by external actuation of the selector shaft in just one direction of its axis of rotation and selective engagement of one, two or none of the brakes.

12 Claims, 4 Drawing Sheets

SELECTOR DEVICE FOR A CHANGE-SPEED GEARBOX

This application claims the priority of German Patent Application No. 100 20 451.1 filed Apr. 26, 2000, the disclosure of which is expressly incorporated by reference herein.

BACKGROUND AND SUMMARY OF THE INVENTION

The invention relates to a selector device for a change-speed gearbox that has a selector shaft that can be subjected to an axial selecting force and is used for actuating gearwheel clutches and relative to which a choosing sleeve is arranged concentrically and in such a way that it can be displaced in a positively guided manner and fixed relative to a housing. It being possible to arrange the selector shaft in an axially displaceable manner in a significant angular position relative to the housing by a latching device but to fix it in an essentially rotationally fixed manner by a latching force that can be overcome.

Selector devices of this kind are distinguished especially by the fact that all that is required for the actuation of the selector shaft, both into its angular positions for initially choosing the new gear and into its axial end positions for engaging (selecting) the new gear, is to exert an external axial actuating force on the selector shaft and, consequently, only a single servomotor (linear motor) is required for automatic operation of the selector device.

In a known selector device of the type as in German Patent Document DE 196 10 104 C2, corresponding to U.S. Pat. No. 5,809,836, the choosing and selecting movements of the selector shaft are already kept small, and hence, short selection times are achieved by virtue of the fact that a gate with a corresponding sliding block is provided for the auxiliary mechanism. The gate has two gate portions, which are arranged offset relative to one another both in the directions of the axis of rotation of the selector shaft and by the differential angle of rotation enclosed between two adjacent significant angular positions of the selector shaft and run parallel to the axis of rotation. Of the mutually opposite ends of the gate portions, at least one end is associated with a gear position of the selector shaft. The gate furthermore has a central gate portion that runs at an angle to the axis of rotation of the selector shaft, this portion being associated with the neutral position of the selector shaft. In this known selector device, multiple shifts, i.e. shifts between two nonadjacent gears, are possible. If the old and the new gear involved in such a multiple shift are not in two adjacent significant angular positions of the selector shaft, the known selector device allows the use of a method for performing such a multiple shift, which requires long choosing and selecting paths. According to this method, the selector shaft passes through the neutral position alternately in both axial directions and the brake is held in the engaged state during its passage in one axial direction and in the disengaged state during its passage in the other axial direction. The direction of the axial motion of the selector shaft is reversed even before a gear position is reached, once a significant angular position that does not include the new gear position to be chosen has been reached and the neutral position has been departed from.

An object of the present invention is to further reduce the gear-change paths and times, especially for multiple shifts, in a selector device of the type stated at the outset.

According to the invention, this object is achieved by at least one additional choosing sleeve arranged concentrically and in such a way that it can be displaced in a positively guided manner relative to the selector shaft and can be fixed relative to the housing.

In the selector device according to the invention, at least one positively guided additional choosing sleeve appropriately coordinated with the positive guidance of the first choosing sleeve makes it possible to perform upshifts and downshifts that involve skipping one or more gears directly, i.e. without reversing the selector shaft several times.

Owing to the axial selecting force, it is possible in a particularly advantageous way to use low-cost linear motors, e.g. hydraulic pistons or electromagnets.

In the advantageous alternative embodiment of the selector device, at least one additional choosing sleeve and the respectively associated additional auxiliary mechanism make it possible, by appropriate coordination, in terms of their level and direction of action, of the transmission ratios of the auxiliary mechanism associated with the first choosing sleeve and of the respective auxiliary mechanism associated with the additional choosing sleeve, to perform upshifts and downshifts that involve skipping one or more gears directly, i.e. without reversing the selector shaft several times.

In an advantageous embodiment of the selector device, the equal but opposite transmission ratios of the auxiliary mechanisms ensure, inter alia, that when the selector shaft is actuated to disengage a mid-range gear and change to an adjacent significant angular position, only the first choosing sleeve has to be activated for an upshift and only the additional choosing sleeve has to be activated for a downshift.

In the case of a refinement of the selector device, which is advantageous particularly for multi-speed transmissions, direct downshifts, even those that involve skipping a number of gears, can be performed by activating an additional choosing sleeve.

Taking this as a starting point, an embodiment of the selector device according to the invention is advantageous also for a 5- or 6-speed transmission, for example, and in which it is possible to skip two or three gears in the case of direct downshifts by activating an additional choosing sleeve.

Another embodiment of the selector device according to the invention that is once again advantageous for multi-speed transmissions and allows direct gear changes that involve skipping two or three or more gears by activating an additional choosing sleeve, this being achieved in this case for the upshifts.

The invention can be employed with particular advantage in a 5- or 6-speed transmission, in which it is possible to skip two or three gears in the case of direct upshifts by activating an additional choosing sleeve.

While the previous embodiments of the selector device according to the invention envisage the use of at least two choosing sleeves with associated auxiliary mechanisms and brakes, the number of gear-change options involving skipping gears is increased in a further advantageous embodiment of the selector device according to the invention by the use of least three choosing sleeves. In this embodiment, two choosing sleeves are provided in all cases and their auxiliary mechanisms each define the minimum differential angle of rotation, which includes just two adjacent significant angular positions, one auxiliary mechanism being designed with an upshift characteristic and the other with a downshift characteristic in terms of the respective direction of action. In this embodiment, a third choosing sleeve is used, the auxiliary mechanism of which—which is designed with an upshift or downshift characteristic—defines a larger differential angle of rotation, which is at least twice as great as the minimum differential angle of rotation.

In another advantageous embodiment of the selector device according to the invention, the number of gear-change options involving skipping gears is increased by the use of at least three choosing sleeves. In this embodiment, just one choosing sleeve is provided, by way of the auxiliary mechanism of which, which is designed with an upshift characteristic, only the minimum differential angle of rotation is defined. The respective differential angle of rotation of the two other auxiliary mechanisms is at least twice as great, one auxiliary mechanism being designed with an upshift characteristic and the other with a downshift characteristic.

Finally, in another embodiment of the selector device according to the invention, it is advantageous that the number of gear-change options involving skipping gears can be further increased by the use of at least four choosing sleeves with associated auxiliary mechanisms and brakes. In this embodiment, two auxiliary mechanisms, each associated with one choosing sleeve, are provided in all cases. These auxiliary mechanisms define only the minimum differential angle of rotation, and one of them has an upshift characteristic and the other has a downshift characteristic. In this embodiment, use is also made, in all cases, of two auxiliary transmissions, which are each associated with one choosing sleeve and define equal or unequal differential angles of rotation of greater magnitude. One of them has an upshift character, and the other has a downshift character.

Other objects, advantages and novel features of the present invention will become apparent from the following detailed description of the invention when considered in conjunction with the accompanying drawings.

BRIEF DESCRIPTION OF THE DRAWINGS

The invention is described below with reference to three embodiments illustrated schematically in the drawing, in which.

DETAILED DESCRIPTION OF THE DRAWINGS

A selector shaft 12 aligned with its axis of rotation 24—24 parallel to the transmission shafts mounted rotatably and in an axially displaceable manner in a housing (merely indicated at 11) of a change-speed gearbox (not shown specifically). Gearwheel clutches are seated on the transmission shafts to couple the free gears of the gear stages that provide the gear ratios to their transmission shaft. These clutches are actuated either individually or in pairs and selectively by selector forks 8, 9 and 10. These in turn are each connected to an associated selector rod 31-8, 31-9 and 31-10 in a manner fixed in terms of motion. These selector rods are both mounted in such a way that they can be displaced axially relative to the housing 11 on respective paths of motion parallel to the axis of rotation 24—24 and are provided with respective selector slots 32 for the engagement of a selector finger 13 arranged radially and in a manner fixed in terms of motion relative to the selector shaft 12. At the same time, the arrangement is such that, in the transmission state in which all the gearwheel clutches are disengaged, the selector finger 13 and all the selector slots 32 are in a neutral position, i.e. central relative to a housing plane that is perpendicular to the axis of rotation 24—24.

The selector rods 31-8, 31-9 and 31-10 are rotationally fixed relative to the housing 11 with their respective selector slots 32 in respectively associated angular positions about the axis of rotation 24—24 of the selector shaft 12. The selector shaft 12 must accordingly be actuated into a significant angular position 12-8 if the selector finger 13 is to be in engagement with the selector slot 32 in selector rod 31-8 in accordance with FIGS. 1 and 2. The selector shaft 12 must be actuated into a significant angular position 12-9 if the selector finger 13 is to be moved into engagement with the selector slot 32 in selector rod 31-9. And, the selector shaft 12 must be actuated into a significant angular position 12-10 if the selector finger 13 is to be in engagement with the selector slot 32 in selector rod 31-10.

Figures 1, 1A:
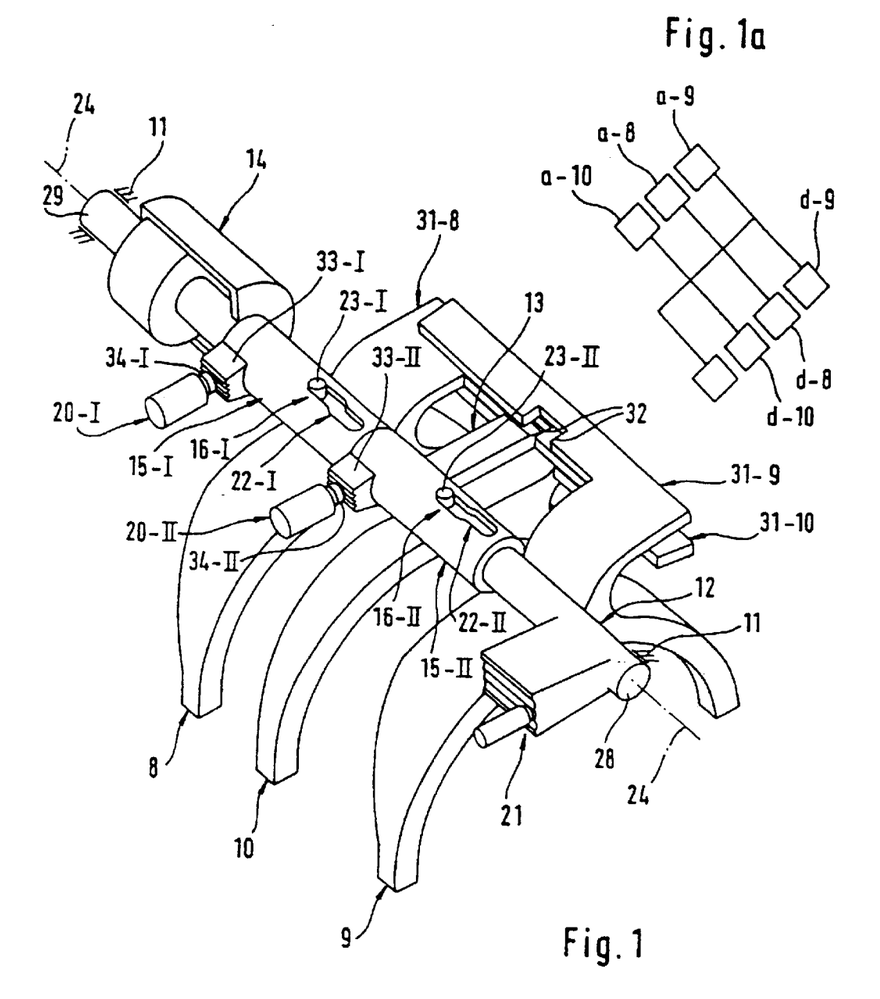
FIG. 1 shows a perspective representation of a selector device according to the invention in the first embodiment.
FIG. 1a shows a position diagram of the positions of the selector shaft of the selector device in FIG. 1.

As will be readily apparent also from the illustration in FIG. 1a, each of the selector rods 31-8, 31-9 and 31-10 can be actuated from the initial neutral position in the axial direction away from the selector finger 13 towards one end 29 of the selector shaft 12 into a gear position a-8, a-9 and a-10 or in the opposite axial direction into a gear position d-8, d-9 and d-10.

To actuate the selector shaft 12 into its two end positions a and d corresponding to the two gear positions, each associated with one selector rod, the selector shaft 12 is coupled at its end 29 to a shift actuator 14 of the axial-piston type.

For the purpose of additionally actuating the selector shaft 12 into its significant angular positions 12-8, 12-9 and 12-10 by way the shift actuator 14, a first choosing sleeve 15-I and a second choosing sleeve 15-II are used, these each being connected to the selector shaft 12 via a respectively associated first auxiliary mechanism 16-I and second auxiliary mechanism 16-II for converting a reciprocating motion into a rotary motion, the reaction in the auxiliary mechanisms in each case being produced by way of an associated first engageable and disengageable brake 20-I and an associated second engageable and disengageable brake 20-II.

While the selector finger 13 is arranged on a central portion of the selector shaft 12, the other end 28 of the selector shaft 12 is connected to a latching device 21, by which the selector shaft 12 is latched in its significant angular positions 12-8, 12-9 and 12-10 relative to the housing 11 while maintaining its axial mobility.

The two choosing sleeves 15-I and 15-II are arranged in such a way that they are rotatable and axially nondisplaceable relative to the housing 11.

The two choosing sleeves 15-I and 15-II are arranged concentrically to the shaft on that section of the selector shaft 12 that lies between the shift actuator 14 and the latching device 21, in such a way that they are capable of both rotary and axial motion relative to the selector shaft 12.

The brakes 20-I, 20-II are arranged in a form-locking manner and, in each case, at the end of the sleeve that faces the shift actuator 14. At that end, the choosing sleeves 15-I, 15-II have braking segments 33-I and 33-II, respectively, that are fixed in terms of motion relative to them and are each provided with an axial brake engagement slot for the angular positions relative to the housing 11. A brake engagement member 34-I or 34-II, arranged in a manner that allows motor actuation and radial motion relative to the axis of rotation 24—24, may engage in a form-locking manner in the brake engagement slots.

The auxiliary mechanisms 16-I, 16-II are each in the form of a gate 22-I or 22-II, arranged in a manner fixed in terms of motion relative to the associated choosing sleeve 15-I and 15-II, and a sliding block or gate pin 23-I or 23-II guided in a sliding manner in the gate and arranged radially and fixed in terms of motion relative to the selector shaft 12.

Figure 2:
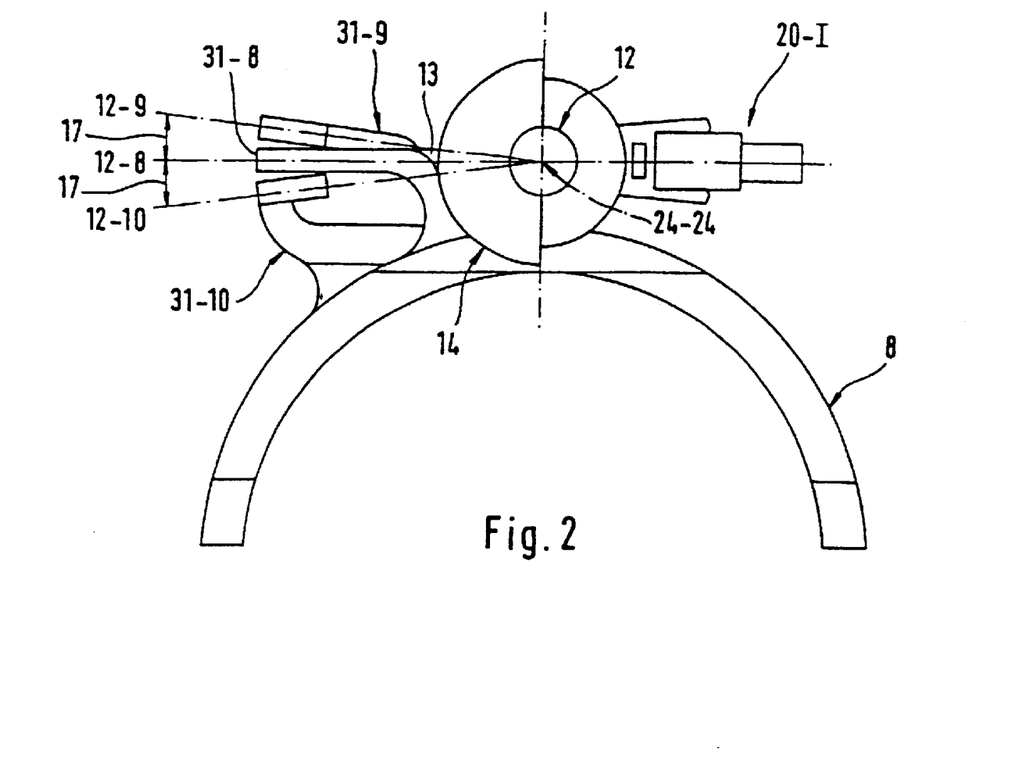
FIG. 2 shows the selector device from FIG. 1 in elevation, viewed in the direction of the axis of rotation of the selector shaft.
Figure 3:
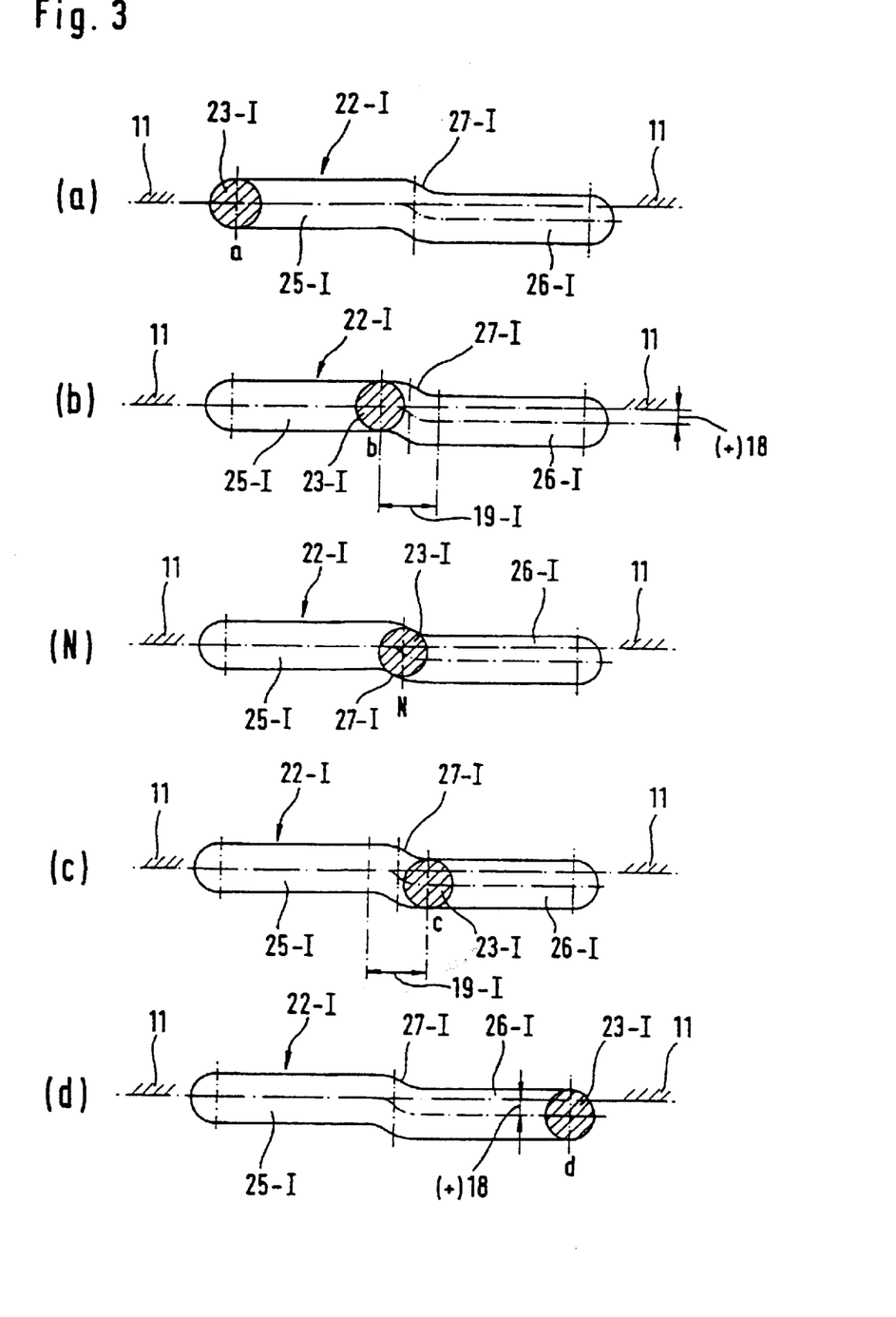
FIG. 3 shows a graphical illustration of the interaction between the selector shaft and one choosing sleeve with reference to the gate in the selector device in FIG. 1 during a gear change.
Figure 5:
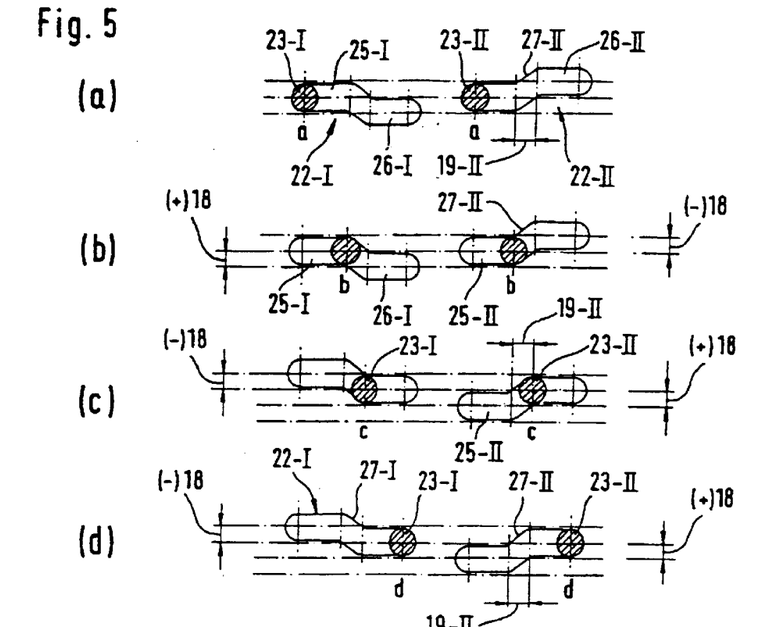
FIG. 5 shows a graphical illustration of the interaction between the selector shaft and both choosing sleeves with reference to the associated gates in the selector device in FIG. 1 during a gear change.

The gates 22-I, 22-II each have two gate portions 25-I, 26-I and 25-II, 26-II that extend parallel to the axis of rotation 24—24 of the selector shaft 12 and are offset relative to one another in the circumferential direction, in the case of gate 22-I by an offset (+)18 (FIG. 3(*b*)) defined as positive and, in the case of gate 22-II, by an offset (−)18 (FIG. 5(*b*)) of the same magnitude but opposite direction. The respective offset 18 corresponds in terms of its absolute value to the minimum differential angle of rotation 17 (FIG. 2) by which the adjacent significant angular positions 12-8 and 12-9 and 12-8 and 12-10 of the selector shaft 12 are offset relative to one another.

Associated with the mutually opposite ends of the gate portions 25-I, 26-I and 25-II and 26-II are respective end positions a and d of the selector shaft 12, which correspond to the gear positions of the selector rods 31-8, 31-9 and 31-10.

At their mutually facing ends, the gate portions 25-I, 26-I and 25-II, 26-II are connected to one another by respective central gate portions 27-I and 27-II extending at an angle to the axis of rotation 24—24 of the selector shaft 12 along a path determined by the offset (+)18 or (−)18. The respective central portions 27-I and 27-II of the gates 22-1 and 22-II are associated with the neutral position N (FIG. 3 (N)) of the respective gate pins 23-I and 23-II and thus with the neutral position of the selector shaft 12.

The mutually facing ends of the gate portions 25-I, 26-I and 25-II, 26-II enclose between them the regions 19-I (FIGS. 3(*b*) and (*c*)) and 19-II (FIGS. 5(*a*), (*c*) and (*d*)) of the neutral position respectively. This region is of considerable significance for the control of the selector shaft 12 by the brakes 20-I, 20-II. The position of the respective gate pins 23-I and 23-II at the transition between gate portions 25-I and 27-I and gate portions 25-II and 27-II is indicated by b (FIGS. 3(*b*) and 5(*b*) respectively). The position of the respective gate pins 23-I and 23-II at the transition between gate portions 26-I and 27-I and gate portions 26-II and 27-II is indicated by c (FIGS. 3(*c*) and 5(*c*) respectively).

The selector device according to the invention in the first embodiment in accordance with FIGS. 1 to 5 operates as follows:

In FIGS. 1 and 2, the selector device is depicted in a state in which the selector rod 31-8 is in gear position a-8 and the selector shaft 12 is in the corresponding end position a (position a of the gate pins 23-1 and 23-II) and is in the significant angular position 12-8 for the engagement of the selector finger 13 in the selector slot 32 of the selector rod 31-8.

Figure 4:
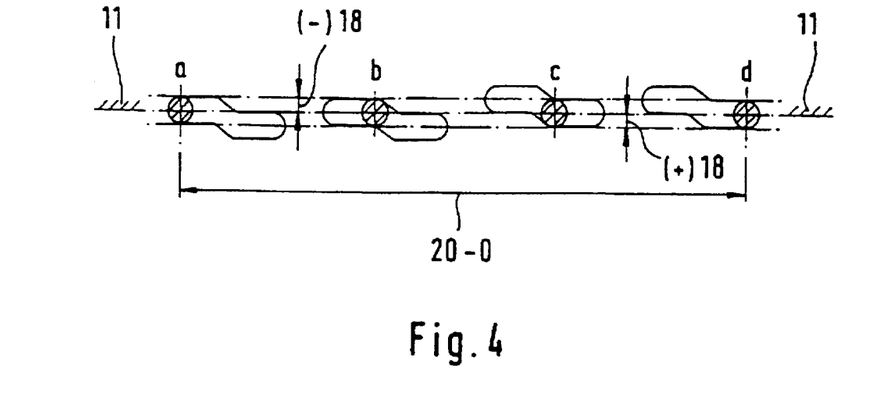
FIG. 4 shows a graphically illustrated sequence of selection phases in the selector device in FIG. 1 during a gear change, in which the brakes of both auxiliary mechanisms are disengaged.

In the case of a gear change from gear position a-8 of selector rod 31-8 into the chosen gear position d-8 of selector rod 31-8 within the same gate, i.e. in the case of a single shift without skipping one gear position, the brakes 20-I, 20-II are held in the respective disengaged position 20-0 and the selector shaft 12 is held in the significant angular position 12-8 by the latching device 21. The selector shaft 12 is actuated by the shift actuator 14 into the end position d corresponding to gear position d-8. The gate pin 23-I twists the reaction-free first choosing sleeve 15-I relative to the selector shaft 12 in one direction, away from selector rod 31-8 towards selector rod 31-10, by the offset (−)18, as the region 19-I of the neutral position N is traversed (FIG. 4). Whereas, the gate pin 23-II twists the reaction-free second choosing sleeve 15-II in the opposite direction, by the offset (+)18, relative to the selector shaft 12, in the other direction, away from selector rod 31-8 towards selector rod 31-9, as the region 19-II of the neutral position N is traversed.

In the case of a gear change out of gear position a-8 of selector rod 31-8 into gear position d-9 of the adjacent selector rod 31-9, i.e. in the case of a triple shift involving skipping the two gear positions d-8 and a-9, the first choosing sleeve 15-I is firmly braked by the associated first brake 20-I in accordance with FIG. 3, while the second choosing sleeve 15-II is held in a reaction-free state by virtue of the disengaged state of the associated second brake 20-II. The selector shaft 12 is actuated by the shift actuator 14 into its end position d corresponding to gear position d-9. A rotary motion corresponding to the differential angle of rotation 17 is imposed on the selector shaft 12 via its gate pin 23-I by gate portion 27-I as the region 19-I of the neutral position is traversed. In accordance with the offset (+)18 in FIG. 3(*d*), the direction of rotation of this motion is thus directed away from selector rod 31-8 towards selector rod 31-9, with the result that the selector shaft 12 is moved into its significant angular position 12-9 for engagement of its selector finger 13 in the selector slot 32 of selector rod 31-9 and actuates the latter into gear position d-9. During this process, the gate pin 23-II of the selector shaft 12 associated with the reaction-free second choosing sleeve 15-II has twisted the latter in the same direction relative to the selector shaft 12, by the offset (+)18.

In the case of a gear change out of gear position a-8 of selector rod 31-8 into gear position a-9 of selector rod 31-9, i.e. in the case of a double shift involving skipping gear position d-8, the shift actuator 14 first of all actuates the selector shaft 12 into the significant angular position 12-9 associated with gear position a-9 by way of the central gate portion 27-I of the firmly braked first choosing sleeve 15-I, with the first brake 20-I engaged and the second brake 20-II disengaged. Secondly, in an abbreviated gear-change action, brake 20-I is likewise disengaged—even before the selector shaft 12 reaches the end position d corresponding to the other gear position d-9—and the shift actuator 14 is switched over, preferably simultaneously, with the result that the selector shaft 12 is actuated into its end position a corresponding to gear position a-9 even before end position d is reached. In this end position a, the gate 22-II of the second choosing sleeve 15-II assumes the position indicated in FIG. 5(*a*) relative to the associated gate pin 23-II.

In the case of a gear change out of gear position a-8 of selector rod 31-8 into gear position d-10 of selector rod 31-10, 10, i.e. in the case of a single shift without skipping a gear position, the shift actuator 14 actuates the selector shaft 12 into its other end position d corresponding to gear position d-9 with the second brake 20-II engaged and the first brake 20-I disengaged. During this process, the central gate portion 27-II of the firmly braked second choosing sleeve 15-II imposes a rotary motion on the selector shaft 12 as it is traversed by the associated gate pin 23-II. This rotary motion corresponds to the offset (−)18 in FIG. 5(d). The selector shaft 12 moves into the significant angular position 12-10 for engagement of the selector finger 13 in the selector slot 32 of selector rod 31-10. In gear position d-10, gate 22-I of the first choosing sleeve 15-I assumes the position indicated in FIG. 5 (d) relative to the associated gate pin 23-I.

In the case of a gear change out of gear position d-9 of selector rod 31-9 into gear position a-8 of selector rod 31-8, i.e. in the case of a triple shift involving skipping the two gear positions a-9 and d-8, the shift actuator 14 actuates the selector shaft 12 into its end position a corresponding to gear position a-8 with the first brake 20-I engaged and the second brake 20-II disengaged. During this process, a rotary motion is imposed on the selector shaft 12 as the central gate portion 27-I of the firmly braked first choosing sleeve 15-I is traversed by the associated gate pin 23-I. This rotary motion corresponds to the offset (−)18 in FIG. 5(d), with the result that the selector shaft 12 moves into the significant angular position 12-8 for engagement of the selector finger 13 in the selector slot 32 of selector rod 31-8. In end position d, the second choosing sleeve 15-II with its gate 22-II assumes the position indicated in FIG. 5(a) relative to the selector shaft 12 and the associated gate pin 23-II.

In the case of a gear change out of gear position d-8 of selector rod 31-8 into gear position a-10 of selector rod 31-10, i.e. in the case of a triple shift involving skipping the two gear positions a-8 and d-10, the same principle of control is employed as in the case of the gear change described above between gear positions d-9 and a-8.

In the case of a gear change out of gear position d-9 of selector rod 31-9 into gear position d-10 of selector rod 31-10, i.e. in the case of a quadruple shift involving skipping the three gear positions a-9, d-8, a-8, the triple shift into gear position a-8 already described above is performed in a first gear-change phase with the first brake 20-I engaged and the second brake 20-II disengaged, this being followed by a second gear-change phase involving the single shift, likewise already described above, into gear position d-10.

In the case of a gear change out of gear position a-9 of selector rod 31-9 into gear position a-10 of selector rod 31-10, i.e. in the case of a quadruple shift involving skipping the three gear positions d-8, a-8, d-10, a single shift into gear position d-8 of selector rod 31-8 is performed in a first gear-change phase, during this shift the first brake 20-I being disengaged and the second brake 20-II being engaged. During this process, the shift actuator 14 actuates the selector shaft 12 into its end position d corresponding to gear position d-8, with the result that a rotary motion corresponding to the offset (+)18 in FIG. 5(d) is imposed on the gate pin 23-II and hence the selector shaft 12 as the central gate portion 27-II of the firmly braked second choosing sleeve 15-II is traversed. As a result, the selector shaft 12 moves into its significant angular position 12-8 for engagement of the selector finger 13 in the selector slot 32 of selector rod 31-8. The gear change is completed by a subsequent second gear-change phase, in which the triple shift, already described above, into gear position a-10, involving skipping the two gear positions a-8 and d-10, is performed.

Figure 6:
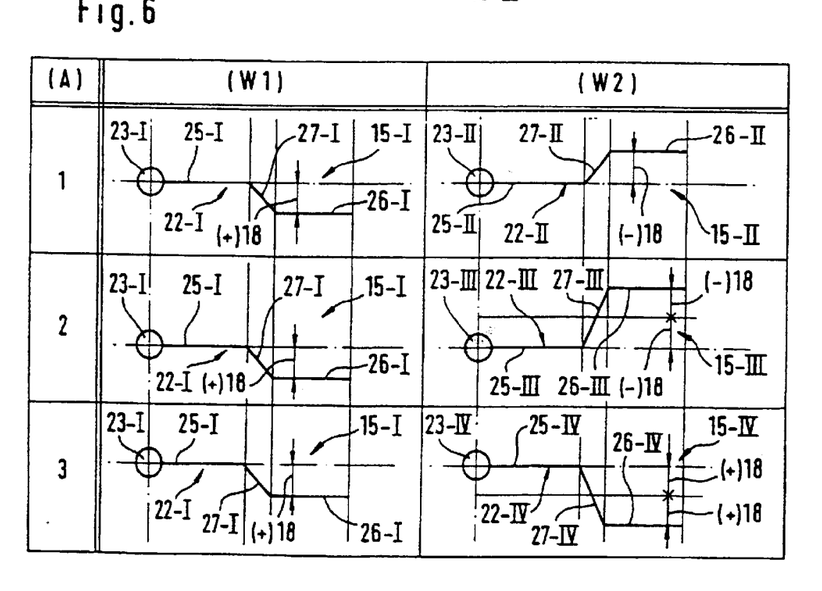
FIG. 6 shows a comparison in table form between the shift characteristics of the first embodiment and two further embodiments of the selector device according to the invention.

In the tabular comparison in FIG. 6, the ordinal numbers 1, 2 and 3 for corresponding embodiments of the selector device according to the invention are shown in column (A), while the two choosing sleeves used in each of the three embodiments are each illustrated only symbolically by the respective shape of their gates in columns (W1) and (W2).

The embodiment in row 1 of FIG. 6 is identical with the first embodiment of the selector device according to the invention described above with reference to FIGS. 1 to 5, the choosing sleeve 15-I with the gate 22-I and the gate pin 23-I and the corresponding gate portions with their mutual offset being illustrated schematically and provided with the reference details or numerals used in the description in column (W1), and the same applies also to the choosing sleeve 15-II with the gate 22-II and gate pin 23-II of the first embodiment illustrated schematically in column (W2).

In the two embodiments in rows 2 and 3, the first choosing sleeve used in accordance with column (W1) is identical with the choosing sleeve 15-I of the first embodiment in row 1 and the same reference numerals or details are therefore used for corresponding features in column (W1).

In the two embodiments in rows 2 and 3, the only difference is the use of a different second choosing sleeve 15-III and 15-IV, respectively, in column (W2), all three embodiments being otherwise identical, thus making it possible to refer to the description and drawing of the embodiment in row 1 with regard to further details of the embodiments in rows 2 and 3.

In the second embodiment of the selector device according to the invention in accordance with row 2 in FIG. 6, a second choosing sleeve 15-III in accordance with column (W2), with a gate 22-III and a gate pin 23-III, is used, differing from the choosing sleeve 15-II in column (W2) of the first embodiment in row 1 only in that, in the former, the offset [(−)18]+[(−)18] between gate portions 25-III and 26-III is twice as large as the offset [(−)18] between the corresponding gate portions 25-II and 26-II in the choosing sleeve 15-II of the first embodiment.

One of the advantages of the second embodiment will be described below by way of example with reference to a gear change from gear position a-9 of selector rod 31-9 to gear position d-10 of selector rod 31-10, i.e. for a triple shift involving skipping the two gear positions, a-8, d-8. In the case of this shift, choosing sleeve 15-III is firmly braked by its associated brake 20-III (no longer illustrated), whereas choosing sleeve 15-II is reaction-free. Actuation of the selector shaft 12 out of its end position a into the other end position d by the shift actuator 14 imposes a rotary motion on the selector shaft 12 as the central gate portion 27-III is traversed by the gate pin 23-III, the selector shaft 12 rotating out of its significant angular position 12-9 involving engagement, up to that point, in selector rod 31-9 into the significant angular position 12-10 for engagement of the selector finger 13 in the selector slot 32 of selector rod 31-10 in accordance with the offset [(−)18]+[(−)18] of gate portions 25-III and 26-III, with the result that finally the selector shaft 12 actuates selector rod 31-10 into its gear position d-10.

The only difference between the third embodiment in accordance with row 3 of FIG. 6 and the second embodiment, described above, in accordance with row 2 of FIG. 6 is that, in the case of the former, the offset [(+)18]+[(+)18] between gate portions 25-IV and 26-IV of the second choosing sleeve 15-IV in accordance with column (W2) has a positive direction of action instead of the negative direction of action [(−)18]+[(−)18] of the second choosing sleeve 15-III of the second embodiment in accordance with row 2.

One of the advantages of the third embodiment will be described below by way of example with reference to a gear change from gear position d-9 of selector rod 31-9 into gear position a-10 of selector rod 31-10, i.e. for a five-fold shift involving skipping the four gear positions a-9, d-8, a-8, d-10. In the case of this shift, the second choosing sleeve 15-IV is firmly braked by the associated brake 20-IV (no longer illustrated), while the first choosing sleeve 15-I remains reaction-free. Actuation of the selector shaft 12 out of its end position d into its end position a by the shift actuator 14 imposes a rotary motion on the selector shaft 12 as the central gate portion 27-IV is traversed by the gate pin 23-IV, the selector shaft 12 rotating out of its previous significant angular position 12-9 involving engagement in selector rod 31-9 into the significant angular position 12-10 for engagement of the selector finger 13 in the selector slot 32 of selector rod 31-10 in accordance with the offset [(+)18]+[(+)18], with the result that finally selector rod 31-10 is actuated into its gear position a-10 by the selector shaft 12.

There are further conceivable embodiments of the selector device with various choosing sleeves and associated auxiliary mechanisms within the scope of the invention. Thus, the first embodiment in row 1 of FIG. 6 can be supplemented by one or both of the second choosing sleeves 15-III and 15-IV in accordance with column (W2), thus giving three further embodiments by this alone.

The embodiments described are merely exemplary embodiments. It would likewise be possible to combine the features described to give different embodiments. Further features of the components of the device that belong to the invention, in particular features that have not been described, can be taken from the geometries of the components of the device that have been illustrated in the drawings.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Selector device for a change-speed gearbox having a selector shaft subject to an axial selecting force and being used for actuating gearwheel clutches, relative to said shaft a choosing sleeve being arranged concentrically such that the sleeve is displaceable in a positively guided manner and fixable relative to a housing, the selector shaft being arranged in an axially displaceable manner in a significant angular position relative to the housing by way of a latching device, and the selector shaft being arranged rotationally fixedly by way of a latching force, wherein at least one additional choosing sleeve is arranged concentrically to the shaft such that the additional sleeve is displaceable in a positively guided manner relative to the selector shaft and fixable relative to the housing.

2. Selector device according to claim 1, wherein the selector shaft
   is mounted rotatably and in an axially displaceable manner in the housing,
   is actuated relative to the housing into the significant angular positions,
   in the respective significant angular position, is actuated out of a neutral position in one of two axial directions of an axis of rotation into an end position associated with a gear, and
   includes the latching device by which the selector shaft can be latched in the angular positions relative to the housing,
wherein the selector device includes the first choosing sleeve
   arranged concentrically to the selector shaft and in such a way as to be capable of relative rotation and axial displacement,
   said first choosing sleeve is mounted rotatably and in an axially nondisplaceable manner in the housing,
the selector device further includes a first auxiliary mechanism for converting a reciprocating motion into a rotary motion
   by which the selector shaft is connected to the first choosing sleeve,
   which enforces a relative rotation between the selector shaft and the first choosing sleeve by a differential angle of rotation corresponding to a distance between two adjacent significant angular positions of the selector shaft when the selector shaft traverses the region of the neutral position in said one direction of the axis of rotation, and
   which has an associated first engageable and disengageable brake, by which the first choosing sleeve can be firmly braked in the significant angular positions of the selector shaft relative to the housing,
wherein the arrangement of the selector device is such that actuation of the selector shaft out of one end position into the neutral position in an engaged state of the first brake, leads to rotation of the selector shaft in the one of two directions of rotation, whereas, in a disengaged state of the first brake, leads to rotation of the first choosing sleeve in the other direction of rotation, in each case by a differential angle of rotation relative to the housing,
wherein the additional choosing sleeve
   is arranged concentrically to the selector shaft and in such a way as to be capable of relative rotation and axial displacement, and
   is mounted rotatably and in an axially nondisplaceable manner in the housing,
wherein an additional auxiliary mechanism is provided, associated with the additional choosing sleeve, for converting a reciprocating motion into a rotary motion
   by which the selector shaft is connected to the associated additional choosing sleeve
   which enforces a relative rotation between the selector shaft and the associated additional choosing sleeve by a differential angle of rotation corresponding to the distance between two angular positions of the selector shaft when the selector shaft traverses the region of the neutral position in one direction of the axis of rotation, and
   which has an associated additional engageable and disengageable brake, by which the additional choosing sleeve associated with the additional auxiliary mechanism can be firmly braked in the significant angular positions of the selector shaft relative to the housing, and wherein
at least one additional arrangement provides that actuation of the selector shaft out of said one end position into the neutral position in an engaged state of the additional brake leads to rotation of the selector shaft in one direction of rotation, whereas, in a disengaged state of the additional brake, leads to rotation of the associated additional choosing sleeve in the other direction of rotation, in each case by the associated differential angle of rotation relative to the housing, and
the first auxiliary mechanism and the respective additional auxiliary mechanism are coordinated in such a way that actuation of the selector shaft out of one end position into the neutral position in the engaged state of the first brake leads to rotation of the selector shaft in one direction of rotation, whereas, in the engaged state of the additional brake, leads to rotation of the selector shaft in the same direction of rotation by a larger differential angle of rotation corresponding to the distance between two nonadjacent significant angular positions or in the other direction of rotation by a differential angle of rotation corresponding to the distance between two adjacent or nonadjacent significant angular positions.

3. Selector device according to claim 2, wherein a differential angle of rotation that includes two adjacent significant angular positions of the selector shaft is defined by an additional auxiliary mechanism associated with the additional choosing sleeve and has an associated additional brake, and in that the coordination of the first and the additional auxiliary mechanisms is such that actuation of the selector shaft out of one end position into the neutral position in the engaged state of the first brake leads to rotation of the selector shaft in one direction of rotation, whereas, in the engaged state of the additional brake, leads to rotation of the selector shaft in the other direction of rotation.

4. Selector device according to claim 2, wherein a larger differential angle of rotation that is enclosed by two nonadjacent significant angular positions of the selector shaft is defined by an additional auxiliary mechanism associated with an additional choosing sleeve and having an associated additional brake, and in that the coordination of the first and the additional auxiliary mechanisms is such that actuation of the selector shaft out of one end position into the neutral position in the engaged state of the first brake leads to rotation of the selector shaft in one direction of rotation, whereas, in the engaged state of the additional brake, leads to rotation of the selector shaft in the other direction of rotation.

5. Selector device according to claim 4, wherein the larger differential angle of rotation defined by the additional auxiliary mechanism is equal to twice a differential angle of rotation enclosed by two adjacent significant angular positions of the selector shaft.

6. Selector device according to claim 2, wherein a larger differential angle of rotation that is enclosed by two nonadjacent significant angular positions of the selector shaft is defined by an additional auxiliary mechanism associated with an additional choosing sleeve and having an associated additional brake, and in that the coordination of the first and the additional auxiliary mechanisms is such that actuation of the selector shaft out of one end position into the neutral position in the engaged state of the first brake leads to rotation of the selector shaft in one direction of rotation and, the engaged state of the additional brake leads to rotation of the selector shaft in the same direction of rotation.

7. Selector device according to claim 6, wherein the larger differential angle of rotation defined by the additional auxiliary mechanism is equal to twice a differential angle of rotation enclosed by two adjacent significant angular positions of the selector shaft.

8. A selector device for a change-speed gearbox, comprising:
   a selector shaft being subject to an axial selecting force to actuate gearwheel clutches and being axially and rotatively displaceable to a significant angular position relative to a housing,
   a choosing sleeve being arranged concentrically to the shaft and being rotatably and axially displaceable relative to said shaft and axially fixed relative to the housing,
   a latching device which rotationally fixes the selector shaft in a significant angular position relative to the housing, and
   at least one additional choosing sleeve being arranged concentrically to the shaft and being rotatably and axially displaceable relative to said shaft and axially fixed relative to the housing.

9. A selector device for a change-speed gearbox, comprising:
   a selector shaft being subject to an axial selecting force to actuate gearwheel clutches,
   a choosing sleeve being arranged concentrically and displaceably in a positively guided manner relative to said shaft and fixedly relative to a housing,
   a latching device by which the selector shaft is arranged in an axially displaceable manner in a significant angular position relative to the housing and in a substantially rotationally fixed manner by a latching force, and
   at least one additional choosing sleeve being arranged concentrically and displaceably in a positively guided manner relative to said shaft and fixedly relative to the housing.

10. Selector device according to claim 9, wherein the selector shaft
   is mounted rotatably and in an axially displaceable manner in the housing,
   is actuated relative to the housing into the significant angular positions,
   in the respective significant angular positions, is actuated out of a neutral position in one of two axial directions of an axis of rotation into an end position associated with a gear, and
   includes the latching device by which the selector shaft can be latched in the angular positions relative to the housing,
   wherein the first choosing sleeve
      is arranged in such a way as to be capable of relative rotation and axial displacement to the selector shaft, and
      is mounted rotatably and in an axially nondisplaceable manner in the housing,
   wherein the selector device includes a first auxiliary mechanism for converting a reciprocating motion into a rotary motion
      by which the selector shaft is connected to the first choosing sleeve,
      which enforces a relative rotation between the selector shaft and the first choosing sleeve by a differential angle of rotation corresponding to the distance between two adjacent significant angular positions of the selector shaft when the selector shaft traverses a region of the neutral position in one direction of the axis of rotation, and
      which has an associated first engageable and disengageable brake, by which the first choosing sleeve can be firmly braked in the significant angular positions of the selector shaft relative to the housing,
   wherein the arrangement of the selector device is such that actuation of the selector shaft out of one end position into the neutral position in an engaged state of the first brake leads to rotation of the selector shaft in one direction of rotation, whereas, in the disengaged state of the first brake leads to rotation of the first choosing sleeve in the other direction of rotation, in each case by a differential angle of rotation relative to the housing, wherein the additional choosing sleeve
is arranged in such a way as to be capable of relative rotation and axial displacement to the selector shaft, and
is mounted rotatably and in an axially nondisplaceable manner in the housing,
wherein an additional auxiliary mechanism is provided, associated in each case with the at least one additional choosing sleeve, for converting a reciprocating motion into a rotary motion
by which the selector shaft is connected to the associated additional choosing sleeve,
which enforces a relative rotation between the selector shaft and the associated additional choosing sleeve by a differential angle of rotation corresponding to the distance between two angular positions of the selector shaft when the selector shaft traverses the region of the neutral position in one direction of the axis of rotation, and
which has an associated additional engageable and disengageable brake, by which the additional choosing sleeve associated with the additional auxiliary mechanism can be firmly braked in the significant angular positions of the selector shaft relative to the housing,
wherein at least one additional arrangement of the selector device is such that the actuation of the selector shaft out of one end position into the neutral position in the engaged state of the additional brake leads to rotation of the selector shaft in one direction of rotation, whereas, in the disengaged state of the additional brake leads to rotation of the associated additional choosing sleeve in the other direction of rotation, in each case by the associated differential angle of rotation relative to the housing, and
wherein the first auxiliary mechanism and the respective additional auxiliary mechanism are co-ordinated in such a way that actuation of the selector shaft out of one end position into the neutral position in the engaged state of the first brake leads to rotation of the selector shaft in one direction of rotation, whereas, in the engaged state of the additional brake leads to rotation of the selector shaft in the same direction of rotation by a larger differential angle of rotation corresponding to the distance between two nonadjacent significant angular positions or in the other direction of rotation by a differential angle of rotation corresponding to the distance between two adjacent or nonadjacent significant angular positions.

11. A method of making a selector device for a change-speed gearbox, comprising:
providing a selector shaft being subject to an axial selecting force to actuate gearwheel clutches,
arranging a choosing sleeve concentrically and displaceably in a positively guided manner relative to said shaft and fixedly relative to a housing,
providing a latching device by which the selector shaft is arranged in an axially displaceable manner in a significant angular position relative to the housing and in a substantially rotationally fixed manner by a latching force, and
arranging at least one additional choosing sleeve concentrically and displaceably in a positively guided manner relative to said shaft and fixedly relative to a housing.

12. A method of changing gears in a selector device for a change-speed gearbox, including a first and second choosing sleeve being arranged concentrically to a selector shaft and axially fixed and rotationally displaceable relative to a housing, comprising;
braking the first choosing sleeve by an associated first brake such that the first choosing sleeve is rotationally fixed relative to the housing,
holding the second choosing sleeve in a reaction free state by disengaging an associated second brake, and
actuating the selector shaft via a shift actuator which provides an axial selecting force to the selector shaft, whereby a rotary motion corresponding to a differential angle of rotation associated with the first choosing sleeve is imposed on the selector shaft via the braked first choosing sleeve, thereby a selector finger fixed relative to the selector shaft moves into a significant angular position to engage a selector rod and actuate the selector rod into a gear position,
wherein the second choosing sleeve is rotated relative to the selector shaft by a differential angle of rotation associated with the second choosing sleeve.

* * * * *